(12) United States Patent
Manning et al.

(10) Patent No.: US 8,728,215 B2
(45) Date of Patent: May 20, 2014

(54) CYCLIC ADSORPTION PROCESS USING CENTRIFUGAL MACHINES

(71) Applicants: Michael S. Manning, Buffalo, NY (US); Andrew C. Rosinski, Orchard Park, NY (US); Paul W. Belanger, Clarence Center, NY (US)

(72) Inventors: Michael S. Manning, Buffalo, NY (US); Andrew C. Rosinski, Orchard Park, NY (US); Paul W. Belanger, Clarence Center, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 14/073,967

(22) Filed: Nov. 7, 2013

(65) Prior Publication Data
US 2014/0053732 A1 Feb. 27, 2014

Related U.S. Application Data

(62) Division of application No. 13/298,680, filed on Nov. 17, 2011.

(51) Int. Cl.
*B01D 53/02* (2006.01)
(52) U.S. Cl.
USPC ............... 96/112; 96/121; 96/127; 96/128; 96/142; 95/19; 417/18; 417/32; 417/44.1; 417/44.2; 417/410.1

(58) Field of Classification Search
USPC ............... 95/19; 96/112, 121, 127, 128, 142; 417/18, 32, 44.1, 44.2, 410.1
See application file for complete search history.

(56) References Cited

U.S. PATENT DOCUMENTS

| | | | |
|---|---|---|---|
| 5,110,264 A | 5/1992 | Murry | |
| 5,203,889 A | 4/1993 | Brown | |
| 5,256,172 A | 10/1993 | Keefer | |
| 5,393,326 A | 2/1995 | Engler et al. | |
| 5,555,749 A | 9/1996 | Wehrman et al. | |
| 5,656,068 A | 8/1997 | Smolarek et al. | |
| 6,273,936 B1 | 8/2001 | Barry et al. | |
| 6,398,517 B1 | 6/2002 | Choi | |
| 6,579,078 B2 | 6/2003 | Hill et al. | |
| 6,698,929 B2 | 3/2004 | Choi et al. | |
| 7,785,405 B2 | 8/2010 | Manning et al. | |
| 8,529,665 B2 | 9/2013 | Manning et al. | |
| 2006/0275114 A1 | 12/2006 | Mangnall et al. | |
| 2007/0227360 A1 | 10/2007 | Atlas et al. | |
| 2011/0277629 A1* | 11/2011 | Manning et al. | 95/15 |

* cited by examiner

*Primary Examiner* — Christopher P Jones
(74) *Attorney, Agent, or Firm* — Salvatore P. Pace

(57) ABSTRACT

A cyclic adsorption process is provided having pressurization and depressurization steps and driven by one or more centrifugal machines operating under acceleration and deceleration conditions wherein the deceleration rate of the machine is controlled to minimize power consumption and maximize the efficiency of the process. The operating speed of the centrifugal machine during deceleration is matched to the measured pressure ratio conditions so that the centrifugal machine arrives at its minimum operating speed near the point required to begin acceleration.

17 Claims, 5 Drawing Sheets

CYCLIC ADSORPTION PROCESS USING CENTRIFUGAL MACHINES

CROSS-REFERENCE TO RELATED APPLICATION

This application is a divisional application of U.S. patent application Ser. No. 13/298,680, now U.S. Pat. No. 8,657,918 B2, filed Nov. 17, 2011, the disclosure of which is incorporated by reference herein.

FIELD OF THE INVENTION

The present invention provides an improved cyclic adsorption system and process for separating components of a gas stream using centrifugal machines. More particularly, the present invention is directed to adsorption processes using centrifugal machines operating under cyclic acceleration and deceleration conditions wherein the deceleration rate of the machine is controlled to minimize power consumption and maximize the efficiency of the process.

BACKGROUND OF THE INVENTION

Cyclic adsorption processes are well known and are typically used to separate a more absorbable component from a less absorbable component. The typical cyclic adsorption process employs a selective adsorbent to remove at least one component of a gas mixture, employing four basic process steps: (1) adsorption, (2) depressurization, (3) purge and, (4) pressurization. The feed fluid, usually a gas, containing the more readily absorbable component and a less readily absorbable component is passed through at least one adsorbent bed capable of selectively adsorbing the more readily absorbable component at a predetermined (upper) adsorption pressure. The stream exiting the bed at this upper pressure is now concentrated in the less readily absorbable component, and is removed as product. When the bed becomes saturated with the readily, absorbable component, the bed is thereafter depressurized to a lower desorption pressure for the desorption of the readily absorbable component, with this component discharged from the system. Such processes are generally used to separate gases such as oxygen or nitrogen from air; hydrocarbons and/or water vapor from feed air gases; hydrogen from carbon monoxide; carbon oxides from other gas mixtures; and the like.

Examples of suitable cyclic adsorption system include, but are not limited to, pressure swing adsorption (PSA), vacuum swine adsorption (VSA) or vacuum pressure swing adsorption (VPSA) processes which use a low pressure or a vacuum and a purge gas to regenerate the sorbent and temperature swing adsorption (TSA) processes which uses a thermal driving force such as a heated purge gas to desorb the impurities.

Traditionally, cyclic adsorption plants, such as VPSA plants, use positive displacement machines such as rotary lobe type blowers operating at fixed speeds to move gas through the process. These machines are robust and generally do not experience any significant operational problems as the pressures and flows change and reverse. However, these machines have low power efficiency and are typically only 60-65% efficient.

More recently, applicants and others have proposed the use of more efficient machines capable of meeting the rigorous requirements of rapid cyclic conditions in place of traditional rotary lobe type machines. For example, U.S. Pat. No. 7,785,405B2 discloses systems and processes for gas separation using high-speed permanent magnet variable-speed motors to accelerate and decelerate centrifugal compressors used in PSA or VPSA processes. The centrifugal compressors are driven by direct drive variable, high speed permanent magnet motors or direct drive variable, high speed induction motors and have efficiencies of approximately 85%. Such compressors can accelerate from low-speed to high-speed and decelerate from high-speed to low-speed at very rapid rates offering a magnitude improvement over the capabilities of conventional machines with conventional motor/gear box systems.

One challenge in using centrifugal compressors is that the compressor performance is very sensitive to rapid changes in pressure, such as the pressure changes that typically occur during cyclic adsorption processes. When the process cycle requires the compressor speed to decelerate due to falling pressure ratios, the control system or controller typically direct the variable frequency drive (VFD) to disable energy input to the motor allowing the drive train (motor rotor and compressor impeller) to "free-wheel" decelerate (coast) down to its minimum speed without consuming power. If the drive train reaches the minimum speed too quickly, such as before the completion of the falling pressurization equalization step, the VFD re-enables energy input to the motor thereby consuming unneeded power. Power as used herein refers to electrical power.

It has now been found that by properly operating the machine during deceleration one can avoid reaching the design minimum operating speed too quickly. By avoiding reaching minimum operating speed before the pressure ratio across the machine starts rising, the machine and can be operated at peak efficiencies. Thus, one objective of this invention is to match the deceleration rate of the compressor/drive train to the decreasing pressure ratios across the machine so that the centrifugal machine arrives at its minimum operating speed near the point required to begin acceleration/reacceleration and, preferably, at the point required to accelerate/reaccelerate and along the compressor's best efficiency line (as shown in FIG. 5). This eliminates the unnecessary power consumption used during machine idling time which occurs after deceleration as further described below.

One method to match the compressor deceleration speeds to the decreasing pressure ratios is through the use of sophisticated control systems that continuously measure, or monitor at frequent points, the machine speed and the pressure ratio. The rotation of the drive train of the centrifugal machine is then controlled using dynamic braking (energy is fed to a braking resistor) or regenerative braking (energy is fed back into the power grid or stored in a flywheel until needed) based upon instructions received from the control system to reduce the deceleration rate and arrive at its minimum operating speed near or at the point required to begin acceleration/reacceleration.

However, the preferred method to control the rotation of the drive train is through the use of aerodynamic braking which can be controlled by either increasing or decreasing the feed fluid mass flow to the compressor which in turn increases or decreases the amount of work done to the fluid by the compressor impeller. This is accomplished by the use of flow control valves, preferably at the suction inlet of the compressor, and matching the mass flow to the desired deceleration rate through the operation and movement of the valves. The valves are opened to release process fluid and thereby the mass flow or closed to reduce mass flow. In this way, the aerodynamic braking that occurs during free-wheel deceleration can be reduced by suction throttling one or more valves at fixed position. One or more control valves can be employed depending on the system and number of adsorber vessels employed. This approach is economical and simple to commercially implement.

BRIEF SUMMARY OF THE INVENTION

The present invention provides an improved process, and system for the use of centrifugal machines in cyclic adsorption processes. This invention provides a method for realizing additional power benefits associated with using centrifugal machines in place of conventional positive displacement machines by minimizing the unnecessary use of power during deceleration.

According to one embodiment of this invention, a cyclic adsorption process is provided comprising:

- at least one adsorber vessel containing at least one adsorber bed undergoing the steps of pressurization and depressurization and driven by at least one centrifugal machine;
- the centrifugal machine undergoing the steps of acceleration and deceleration in accordance with requirements of the cyclic adsorption process, and
- a controller for receiving data signals for the process conditions and sending instructions to the centrifugal machine in response to the conditions; the improvement comprising measuring the pressure ratio conditions during deceleration and matching the operating speed of the centrifugal machine to the measured pressure ratio conditions so that the centrifugal machine arrives at its minimum operating speed near the point required to begin acceleration.

In another embodiment, a cyclic adsorption process comprising (i) pressurizing a feed gas and passing the feed gas through an adsorbent bed which adsorbs at least one readily adsorbed gas while passing through at least one less adsorbed gas as a product gas and (ii) depressurizing the adsorbent bed containing the at least one more readily adsorbed gas to desorb the adsorbed gas from the adsorbent bed; wherein the process comprises

- passing the feed gas or the product gas through at least one centrifugal machine for the pressurization and depressurization steps, the at least one centrifugal machine undergoing acceleration and deceleration conditions,
- measuring the pressure ratio conditions during the deceleration conditions and sending a signal to a controller for receiving data signals with the pressure ratio conditions data,
- having the controller convert the data signals to instructions using a predetermined algorithm designed to instruct the centrifugal machine to arrive at the minimum operating speed at the point required to accelerate along the best efficiency line, and
- sending the instructions from the controller to at least one flow control valve which moves in response to the instructions to move to adjust the mass flow of the process gas to vary the operating speed of the centrifugal machine so as to obtain its lowest operating speed at the point required to begin acceleration.

DETAILED DESCRIPTION OF THE INVENTION

Figure 1:
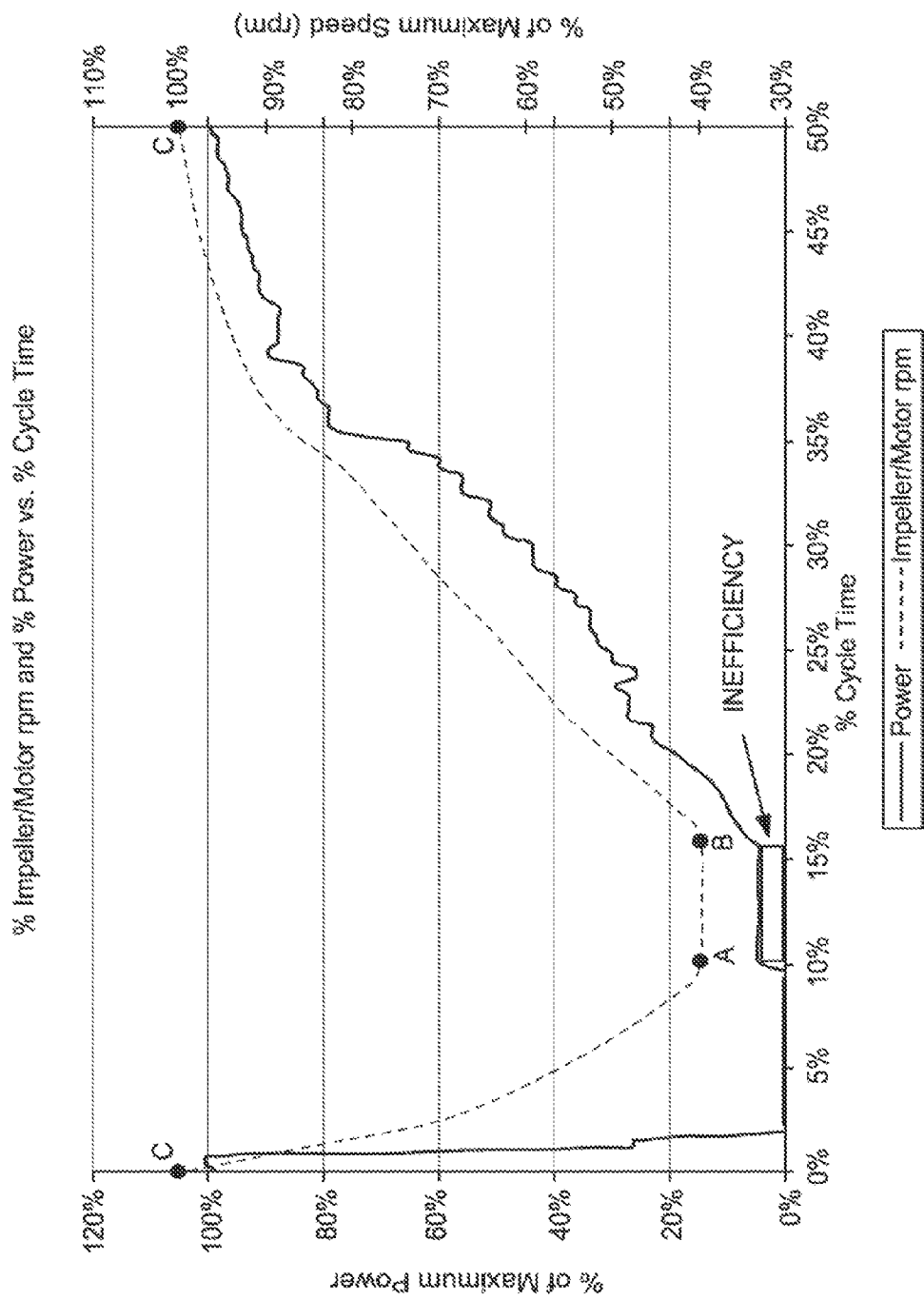
FIG. 1 is a graph illustrating how the prior art centrifugal machine operates during the period through deceleration to acceleration during the steps of depressurization and pressurization in a typical VPSA oxygen process.

As described above, the present invention provides an improved system and process for the use of centrifugal compressors in cyclic adsorption processes. This system and process uses at least one centrifugal compressor optimized to the operating requirements of the process cycle. More specifically, the centrifugal compressor is generally synchronized with the power requirements during the deceleration and acceleration (or re-acceleration) cycle steps such that the power is disengaged during deceleration and only reengaged upon acceleration. This minimizes power consumption and maximizes process efficiency in rapid cyclic adsorption processes.

Deceleration generally occurs when rapid changes in vessel pressure, such as during falling pressure equalization, result in decreasing pressure ratios across the centrifugal machine. For example, in single bed oxygen production systems, deceleration will occur in steps including oxygen recovery depressurization, oxygen recovery overlap evacuation, evacuation, oxygen recovery overlap feed, and product pressurization overlap feed. In multiple bed oxygen production systems, deceleration will occur in steps including falling pressure equalizations, falling pressure evacuations with overlap equalization, falling pressure evacuations, raising pressure evacuations with overlap equalization, rising pressure feedings with overlap equalization, and rising pressure feedings with overlap product pressurization.

The cyclic adsorption processes useful herein will have at least one vessel containing at least one adsorbent bed therein (herein an "adsorber vessel" and an "adsorber bed" respectively) and the adsorber bed can have one or multiple layers and types of adsorbents. The processes can include the separation of fluids for a wide variety of applications such as used to separate contaminates from end products in the air separation, refining, natural gas, chemical and petrochemical industries. Typically, the processes are gas separation processes and examples of preferred processes include PSA, VSA, and VPSA processes.

Adsorbents suitable for such processes are generally well known and include molecular sieves, aluminas, silicas, zeolites, catalysts with or without associated (coated or impregnated) active metals or metal oxides, and the like. For PSA, VSA, and VPSA air separation processes, suitable adsorbents include, but are not limited to, A, X, and Y type zeolites and various ion exchanged forms of these zeolites, as well as silica-alumina, alumina, silica, titanium silicates, phosphates and mixtures thereof.

For illustrative purposes and without limiting the scope of this invention, a typical VPSA process for separating oxygen from air is described herein. The VPSA process is one wherein an adsorber bed undergoes the following steps:
1) The adsorber bed is pressurized to a desired pressure wherein nitrogen is readily adsorbed by the adsorbent as the feed air is passed across the bed;
2) Product gas rich in oxygen is produced as the nitrogen in the feed air is adsorbed;
3) The bed containing the adsorbent is evacuated to a low pressure (typically under vacuum) wherein the adsorbed nitrogen is desorbed from the adsorbent in the adsorber bed; and, preferably,
4) A purge gas is passed through the bed to remove any remaining nitrogen.

The cycle time is understood by the skilled person to mean the amount of time needed to complete one cycle; e.g., the process steps in order and then return to the starting condition.

Some adsorption processes will have more steps or multiple adsorber beds and often use one or more compressors/ blowers for each of the pressurization and depressurization steps. If the VPSA plant contains two or more adsorber vessels, each vessel undergoes the above steps; however, the vessels are operated out of phase so that while one vessel is producing product the other is being regenerated. Also, in a two adsorber vessel process, two compressors are typically used wherein one compressor is dedicated to feeding gas to the first adsorber vessel while the other is dedicated to evacuating the second adsorber vessel; often referred to as a feed compressor and a vacuum compressor, respectively.

Regardless of whether a single vessel, two vessels, or multiple vessels are used, the pressures and flows within the process change quickly as the process cycles from adsorption to desorption. Generally, the pressure of a vessel will change from a low pressure condition of at or below atmospheric, such as about 6 to 8 psia, to a high pressure condition of above atmospheric, such as about 19 to 24 psia, in a rapid periodic cycle time, such as in less than one minute. Some adsorption processes can require even wider spans of pressures and/or vacuums in similar rapid cycle times.

Cyclic adsorption systems have at least one adsorber bed that is cyclically pressurized by a positive displacement feed compressor and sometimes evacuated by a separate vacuum compressor. In the present invention, one centrifugal machine, designed for variable-speed, direct drive operation, is used for both pressurization and depressurization of a single adsorber vessel and multiple vessel systems will have separate centrifugal machines; one for feeding gas to the vessels and one for evacuating the vessels.

Centrifugal compressors, sometimes referred to as radial compressors, are well known. They operate at high speeds and generate high pressure rises. The term "centrifugal machines" is used herein to describe the operating machine which includes the compressor with impeller and the motor/drive system. The term "compressor" is used herein to refer to the compressor, impeller, shroud and volute. The centrifugal machines have centrifugal compressors driven by direct drive variable, high speed permanent magnet motors having VFDs which permit the compressor to cyclically accelerate from a low operating speed to a high operating speed and decelerate from a high operating speed to a low operating speed at rapid rates as required by current PSA, VSA, or VPSA cycle times. The term "centrifugal machines" is also intended to include centrifugal compressors driven by variable, high speed induction motors using direct drive systems. Both of these motors are capable of operating the compressors at high speeds such as greater than 5000 RPM, preferably greater than 10,000 RPM, and most preferably greater than 15,000 RPM. Preferably, for VPSA, VSA, and PSA processes, the low operating speed will be not more than 7000 RPM and the high operating speed will be greater than at least 13,000 RPM.

The centrifugal compressors used here can have single or multiple stages, can have various impellers or blade configurations, and can be configured to operate in association with one or more beds. The centrifugal machines can also be used in combination with other positive displacement machines. However, one centrifugal machine is typically used per service and it is preferred that the centrifugal machine is used in the absence of a positive displacement machine.

FIG. 1 is a graph illustrating how the prior art centrifugal machine operates during the period through one half cycle in a typical VPSA oxygen process. The compressor drive train speed and power consumption are plotted as a function of time expressed as a fraction of the total cycle time. Referring to FIG. 1, when the process cycle requires the centrifugal machine to decelerate due to falling pressure ratio requirements, the VPSA disables energy input to the machine, allowing the drive train to free-wheel decelerate down to its designed minimum speed without consuming any electrical power as illustrated between points C and A in FIG. 1. But if the drive train reaches the minimum speed too quickly (e.g., before the pressure ratio across the machine starts to rise), the VFD will re-enable energy input to the motor and hold the drive train at the minimum speed line as shown at points A through B in FIG. 1 consuming power unnecessarily. This time, shown as the period between points A and B, is referred to herein as the "idle time" and should be minimized. Idle time is defined here as the period of time after deceleration wherein power is provided to the centrifugal machine for the purpose of maintaining compressor speed at a value above the minimum speed required by the process (typically 30% to 40% of the design speed). Electrical power provided to the motor during the idle time is wasted since power is consumed without useful work being done. In order to achieve improved efficiency in a typical cyclic adsorption process, the idle time is preferably less than eight (8) percent of the total cycle time and, for PSA, VSA, or VPSA processes, preferably less than 3 seconds, more preferably less than 1 second.

Figure 2:
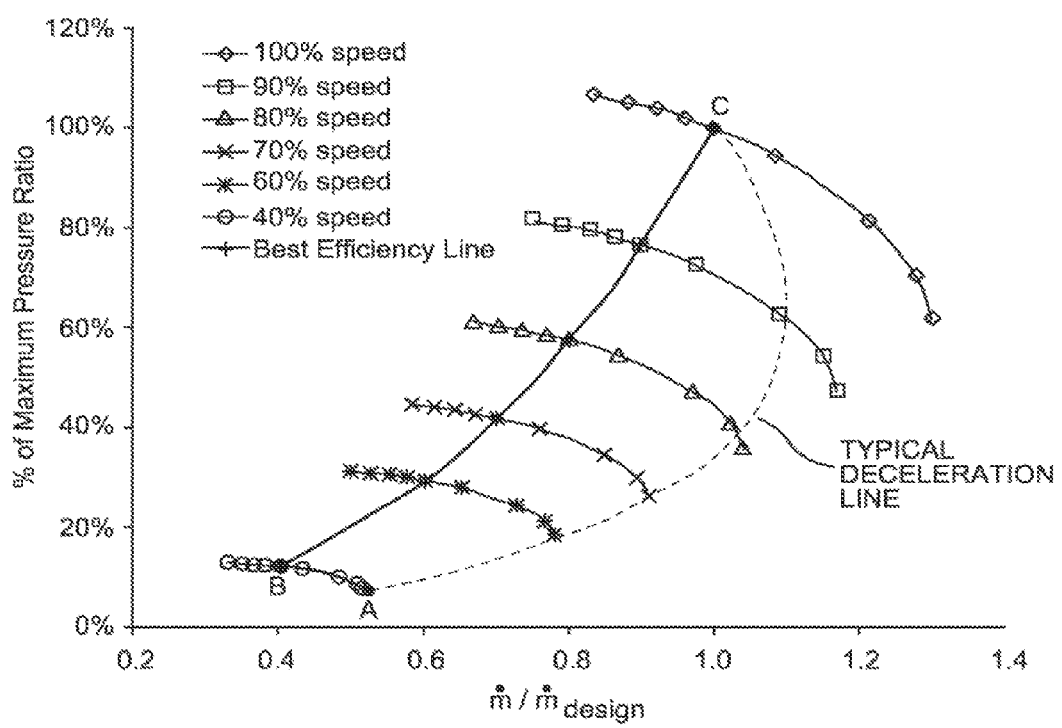
FIG. 2 is a graph showing a centrifugal compressor performance map with curves indicating the flow generated by the centrifugal machine for various operating speeds and pressure ratios across the machine and the deceleration line during operation of the process shown in FIG. 1.

An alternate way of illustrating the problem is shown in FIG. 2 wherein the cycle of the compressor is shown in a plot of % pressure ratio plotted against a non-dimensional mass flow fate. The line connecting points B and C is the best efficiency line. The flow coefficient is 1.0 at a speed that is 100% of the design speed and design pressure ratio. From points C to A, the centrifugal machine is decelerating. As the pressure ratio falls, the flow coefficient may actually first increase before decreasing as shown. From point A to point B, the machine operates along its minimum constant speed line (here, 40% of design speed shown as 0.4). As the pressure ratio increases, the flow coefficient decreases as shown. From points B to C, the machine is accelerating. As the pressure ratio increases, the flow coefficient also increases.

Figure 3:
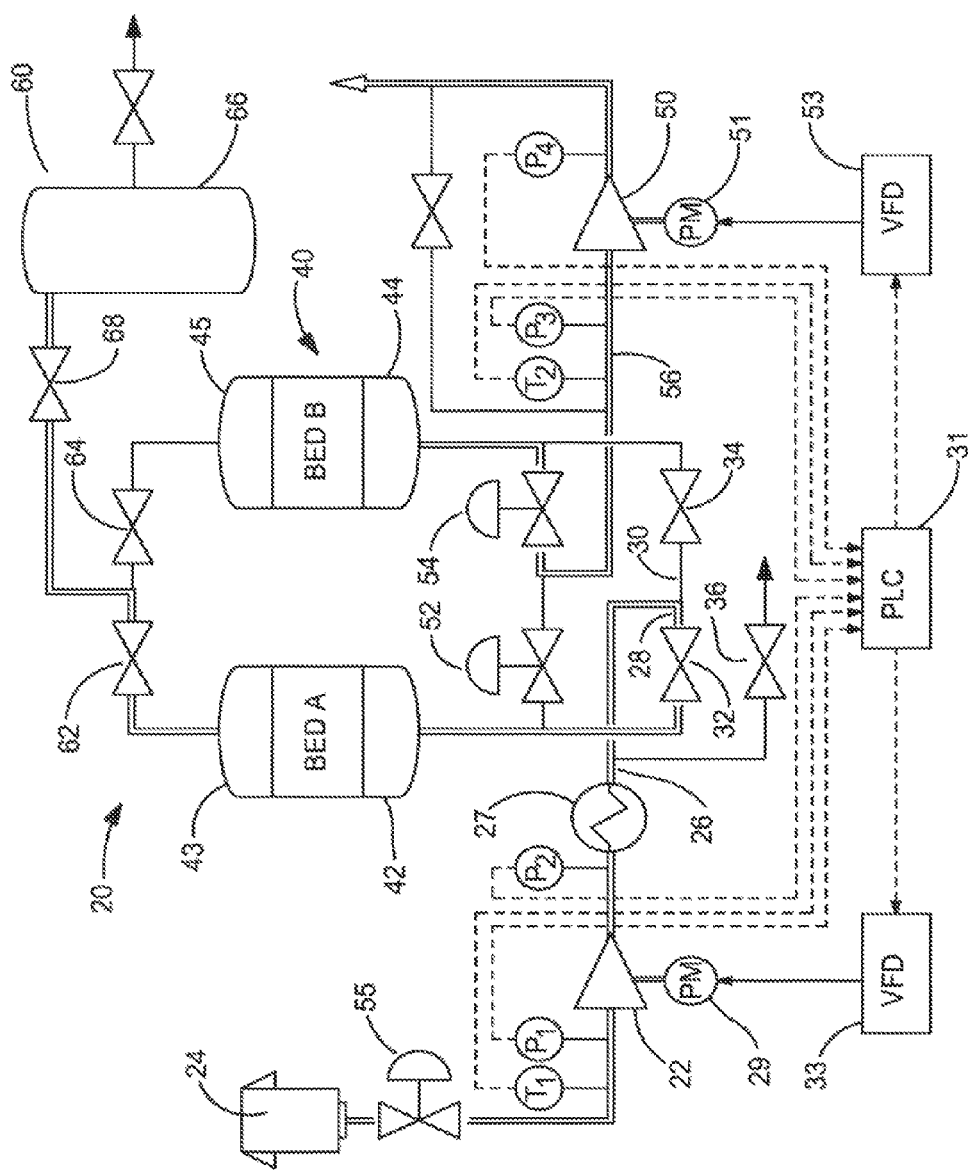
FIG. 3 is a schematic of a two-vessel vacuum pressure swing adsorption system and process according to one embodiment of the present invention.

FIG. 3 is a schematic of a two-bed VPSA system according to one embodiment of the present invention for the production of oxygen from air. Since the basic process is well known, only key elements of the process will be described. According to FIG. 3, a VPSA system 20 includes feed compressor 22, adsorber bed 40, and vacuum compressor 50 to efficiently produce the less selectively adsorbed gas, oxygen. At least one of the feed compressor 22 and vacuum compressor 50 is a centrifugal machine, preferably vacuum compressor 50. In a more preferred embodiment, both feed compressor 22 and vacuum compressor 50 are centrifugal machines although those skilled in the art will also understand that for PSA and other non-vacuum systems, vacuum compressor 50 would not be utilized. Compressors 22 and 50 are driven by permanent magnetic motor 29 with VFD 33 and permanent magnetic motor 51 with VFD 53, respectively, as shown.

Referring again to FIG. 3, feed centrifugal compressor 22 includes a single-stage compressor driven by permanent magnet motor 29, having inlet 24 for drawing air feed gas directing a pressurized airflow through a feed air aftercooler 27, and then through discharge manifold 26 to respective parallel inlet lines 28 and 30. Respective first and second pressurizing valves 32 and 34 are plumbed in the distal ends of the respective lines to selectively pressurize respective portions of the adsorber system 40. A vent valve 36 connects to an intermediate portion of manifold 26 to selectively bypass airflow away from the adsorber system 40. The valves are sequenced through a programmable logic controller 31 according to timing corresponding to the process steps for the method of the present invention.

Adsorbent system 40 comprises a dual vessel system, with adsorber vessels A and B each containing at least one adsorber bed (not shown) and having respective bottom portions 42 and 44 disposed downstream of the respective first and second pressurizing valves 32 and 34 in an alternating parallel arrangement. Respective lop portions 43 and 45 provide a convenient interface for connecting a product supply mechanism 60 comprising a single product surge tank 66. As mentioned above, alternative systems in accordance with the present invention could employ a single adsorber vessel or multiple vessels.

At least one adsorber bed including one or more adsorbent layers or materials is contained in each adsorber vessel (A and B), preferably of the radial flow type. Radial flow vessels are known and include an enlarged feed end of overall asymmetric cross-section of the gas flow. Radial flow vessels accommodate large gas flow ranges and provide only a low pressure drop across the bed in the direction of gas flow. Such vessels also provide a more uniform flow distribution through the bed and typically offer a restrained bed with an enlarged inlet area. It should be noted, however, that alternative flow vessels such as axial or horizontal beds can be used in the present invention.

The vacuum compressor 50 is plumbed to respective first and second depressurizing valves 52 and 54 that connect to vacuum manifold 56. The valves are plumbed in parallel opposing relationship to the first and second pressurizing valves 32 and 34. Like the pressurizing valves, the depressurizing valves are sequenced by controller 31. The manifold terminates in a single stage vacuum compressor 50 is preferably a centrifugal vacuum compressor, directly driven by a high-speed permanent magnet motor 51 designed for variable-speed operation, and evacuates respective beds A and B during the predetermined cycle steps. The operation of this system is more fully shown and described in U.S. Pat. No. 7,785,405.

As can be appreciated from FIG. 3, $P_1$ can remain constant (e.g., at ambient conditions) while $P_2$ will be responsive to conditions in adsorber vessels A and B ($P_2$ can vary or remain constant during pressurization, depressurization and during product make steps). As $P_2$ varies, the ratio of $P_2/P_1$ will likewise vary. Similarly, $P_4$ can remain constant (e.g., at ambient conditions) while $P_3$ will be responsive to conditions in the adsorbent vessels ($P_3$ can vary or remain during pressurization, depressurization and during product make steps). As $P_3$ varies, the ratio of $P_4/P_1$ can likewise vary. Thus, the pressure ratios for the feed and vacuum compressors can vary or remain constant based on the conditions in vessels A and/or B. Feedback to controller 31 regarding the pressure ratios can allow for the compressor operating speed to be adjusted appropriately. Accordingly, by continuously varying the compressor speeds to match the pressure ratio requirement which itself is varying because of the steps of depressurizating/evacuating and pressurizing the adsorber vessels A and B, the compressors can be operated near, and preferably at, their peak efficiencies from 100% design speed to a substantially lower speed. This is easily accomplished by the skilled person using the information, calculations and performance maps which are stored in (e.g., hard-coded) the controller 31, which then sends a signal to the VFD and associated drive train. It will be appreciated that in the exemplary VPSA system for oxygen production shown in FIG. 3, $P_4$ and $P_1$ could be at or near ambient conditions.

With continued reference to FIG. 3, the product supply mechanism 60 includes respective first and second product outlet valves 62 and 64 disposed at the top of the respective top portions 43 and 45 of vessels A and B to direct the oxygen product flow from each bed to purge the other bed, equalize the pressure in the other bed, or flow to surge tank 66 for storage. Isolation valve 68 interposed between surge tank 66 and outlet valves 62 and 64 cooperates with outlet valves 62 and 64 according to sequencing commands from the controller 31 to effect the proper purge and/or equalization procedures.

In order to minimize the use of unneeded power by the centrifugal machine(s) during deceleration, flow control or throttle valves 55, 52 and 54 are placed at the suction inlet to the centrifugal machines. Valve 55 is a new valve for purposes of this invention while valves 52 and 54 are replacement valves for the on/off pressurizing valves previously used. Valves 55, 52 and 54 are preferably placed in the suction piping at a distance equivalent to the diameter of two or more times the suction pipe diameter and placed upstream of the compressor to minimize turbulence as the fluid (air) enters the compressor.

When the adsorption cycle requires the compressor speed to decelerate due to falling pressure ratio requirements, controller 31 directs VFD 33 to disable energy input to the machine, allowing the drive train to free-wheel decelerate to its minimum speed without consuming any electrical power as illustrated between points C and A in FIG. 1. But if the deceleration rate is too fast and the drive train reaches the minimum speed too quickly (e.g., before the pressure ratio across the machine starts to rise), the controller 31 is programmed (based on the minimum design speed) to direct VFD 33 to re-enable energy input to the motor and hold the drive train at the minimum speed line as shown at points A through B in FIG. 1 consuming power unnecessarily. An alternate way of illustrating the problem is shown in FIG. 2 wherein the cycle of the compressor is shown in a plot of % pressure ratio plotted against a non-dimensional mass flow rate. The idle time is shown as the time period between points A through B and the power consumption associated with this idle time should be reduced or preferably eliminated.

Figure 4:
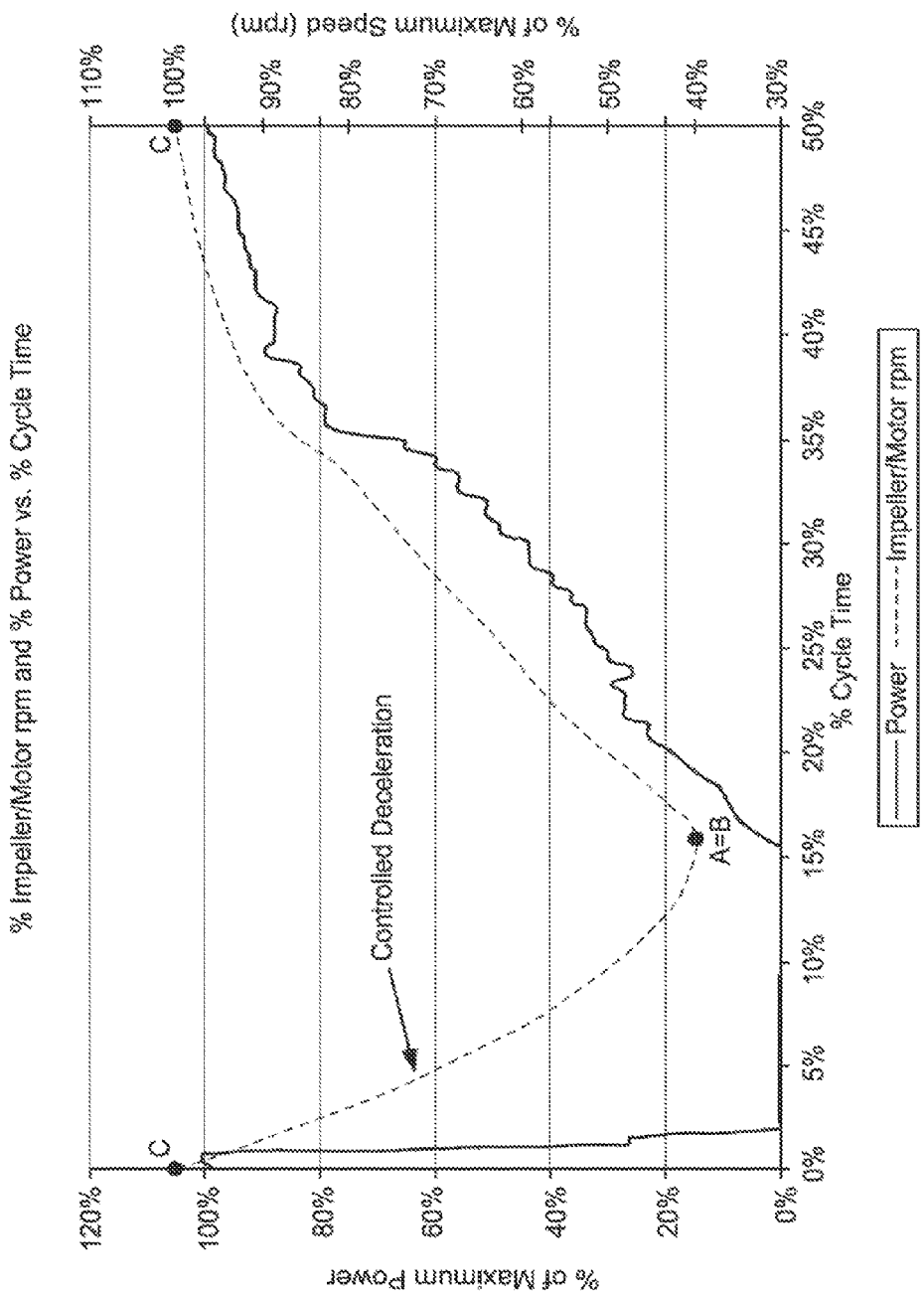
FIG. 4 is a graph illustrating how the centrifugal machine operates during the period through deceleration to acceleration during the steps of depressurization and pressurization in a preferred embodiment of the present invention.

Referring again to FIG. 3, flow control values 55, 52 and 54 are adjusted to the extent and degree necessary to reduce the inlet density, and thus adjust the process gas mass flow to the centrifugal machines. The control valves can be operated to open or close, but that more often the valves are closed to reduce the inlet density and reduce mass flow as described in this embodiment. By reducing the mass flow of gas to the centrifugal compressors 22 and 50, the amount of work done to the gas by the impeller is reduced (i.e., less aerodynamic braking) thereby slowing the deceleration rate of the compressor(s) drive train as illustrated in FIG. 4. The deceleration from points C to A is slowed by closing the control valves such that point A equals point B, which is the point of acceleration from points B to C. Thus, flow control valves 55, 52 and 54 are closed to the extent and degree necessary to reduce the mass flow of the feed gas as needed to reduce the deceleration rate of the impeller and the centrifugal machine. The deceleration rate is preferably matched to the pressure ratio(s) so that the centrifugal machine does not fully decelerate before the pressure ratio rises and thereby arrives at its minimum operating speed near, or preferably at, the point required to begin acceleration/reacceleration. Further, the centrifugal machine preferably arrives at the minimum speed along its best efficiency line.

In a typical operation in one embodiment of this invention, the pressure ratio conditions are measured during the deceleration step with a pressure measuring device which sends a data signal to the controller. The controller converts the data signals into instructions using a predetermined algorithm designed to instruct the centrifugal machine to arrive at the minimum operating speed at the point required to accelerate along its predetermined best efficiency line. The controller sends the instructions to at least one flow control valve which moves in response to the instructions adjusting the mass flow of process gas to vary the operating speed and reduce the deceleration rate of the centrifugal machine to obtain its lowest operating speed near or at the point required to begin acceleration.

As used herein, "near the point required to begin acceleration" means that the minimum pressure ratio achieved across the machine occurs at substantially the same point in time as the machine reaches its minimum operating speed, such as within a three seconds, and "at the point required to begin acceleration" means that the minimum pressure ratio achieved across the machine occurs at the same point in time, within 1 second, as the machine reaches its minimum operating speed. These points are determined from the compressor performance map as described below.

Figure 5:
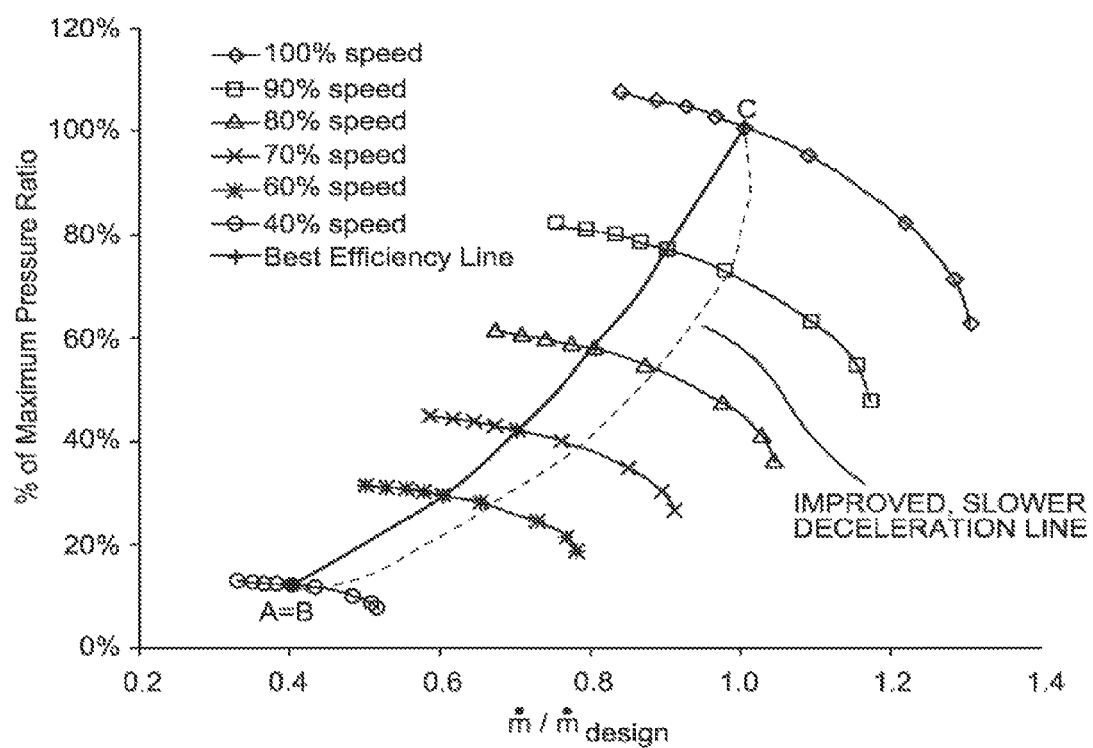
FIG. 5 is a graph showing a centrifugal compressor performance map with curves indicating the flow generated by the centrifugal machine for various operating speeds and pressure ratios across the machine and the deceleration line during the operation of the process shown in FIG. 4.

The required movement of the suction control valves necessary to release fluid/gas to slow down the deceleration rate of the drive train and enable the compressor to arrive at the minimum operating speed at the point required to accelerate along the best efficiency line can be experimentally determined using the information plotted on FIG. 4 and FIG. 5 and automatically controlled using a feedback control algorithm in the controller. The pressure ratio conditions are compared to the predetermined best efficiency operation for the given centrifugal machine and adjusted as appropriate. The closer the final deceleration point (minimum operation speed) is in time to the point required to begin acceleration as shown in FIG. 4, the less power is wasted by eliminating the power consumption during the idle time. It is preferred that the final deceleration point A be substantially the same as the beginning acceleration (or re-acceleration) point B and more preferred that the final deceleration point is the same as the beginning acceleration point thereby eliminating compressor idle time.

It is understood that one objective of this invention is to avoid idle lime and match the final deceleration point to the point at which the machine reaccelerates. In other words, these two points should occur simultaneously. However, it is difficult to achieve such precision in practice with current technology and one skilled in the art understands that small variances are to be expected. Overall, it has been observed that the operating speed of the centrifugal machine during deceleration is maintained at a value above the minimum speed permitted by the requirements of the process for a time of less than eight (8) percent of the total cycle time.

It should also be apparent to those skilled in the art that the subject invention is not limited by the two-bed VPSA process for the separation of oxygen from air as described herein which has been provided to merely demonstrate the operability of the present invention. The present invention can be employed for any cyclic adsorption process using one or more centrifugal machines and one or more adsorber vessels and the selection of suitable adsorption processes, process conditions, process cycles, cycle times, vessel size, and the like can be determined by one skilled in the art from the specification without departing from the spirit of the invention as herein described. The scope of this invention includes equivalent embodiments, modifications, and variations that fall within the scope of the attached claims.

What is claimed is:

1. An adsorption system for the separation of a more absorbable gas from a less absorbable gas in a gas mixture comprising:
   at least one adsorber vessel containing at least one adsorber bed for receiving the more absorbable gas and capable of undergoing the steps of pressurization and depressurization;
   at least one centrifugal machine in fluid flow communication with the adsorber vessel and designed to provide gas flow for the pressurization and the depressurization steps and which accelerates and decelerates in response to instructions;
   a controller for receiving data signals for the decreasing pressure ratio conditions across the centrifugal machine during deceleration and capable of sending instructions to the centrifugal machine and the flow control valves in response to the conditions;
   one or more flow control valves located at the suction inlet of the centrifugal machine and capable of adjustment upon receiving instructions to adjust;
   wherein the centrifugal machine is designed to pressurize the adsorber bed in which the more absorbable gas is adsorbed while removing the less absorbable gas from the adsorber vessel bed and/or depressurized the adsorber bed to remove the more absorbable gas from the adsorber bed;
   and further wherein the controller sends instructions to the one or more flow control valves which adjust in response to the instructions and adjusts the mass flow of the more absorbable gas during deceleration such that the deceleration rate of the centrifugal machine obtains its lowest operating speed near the point required to begin acceleration.

2. The adsorption system of claim 1 wherein the one or more flow control valves are placed in the suction piping at a distance equivalent to the diameter of two or more times the suction pipe diameter upstream of the machine.

3. The adsorption system of claim 1 wherein the more absorbable gas is nitrogen and the less absorbable gas is oxygen.

4. A pressure swing adsorption system for the separation of a at least one more absorbable gases from one or more less absorbable gases in a gas mixture comprising the following components in fluid flow communication:
   at least one adsorber vessel containing at least one adsorber bed for adsorbing and desorbing the at least one more absorbable gases during cyclic operation;
   at least one centrifugal machine having a compressor and drive train and designed to accomplish the steps of at least depressurization and pressurization and capable of accepting instructions for accelerating and decelerating during the pressurization and depressurization steps;
   a controller for receiving data signals about the operating conditions in the system including the pressure ratio conditions during deceleration and for sending instructions to the centrifugal machine in response to the operating conditions; and a control system in communication with the drive train and capable of accepting the instructions from the controller to control the speed of the drive train during deceleration; and wherein the controller is configured to send instructions to the control system to reduce the deceleration rate of the centrifugal machine in response to the decreasing pressure ratio conditions to arrive at the minimum operating speed of the centrifugal machine near the xpoint required to begin acceleration.

5. A pressure swing adsorption system of claim 4 wherein the control system is a dynamic braking system.

6. A pressure swing adsorption system of claim 4 wherein the control system is a regenerative braking system.

7. A pressure swing adsorption system of claim 4 wherein the control system is an aerodynamic braking system.

8. A pressure swing adsorption system of claim 7 wherein the aerodynamic braking system is comprised of one or more flow control valves at the suction inlet of the centrifugal machine and capable of receiving the instructions from the controller for movement of the values.

9. A pressure swing adsorption system of claim 8 wherein the flow control valves are capable of being opened to increase mass flow or closed to reduce mass flow.

10. A pressure swing adsorption system of claim 9 wherein the flow control valve(s) are placed in the suction piping at a distance equivalent to the diameter of two or more times the suction pipe diameter upstream of the centrifugal machine.

11. A pressure swing adsorption system of claim 4 wherein the centrifugal machine is used in the absence of a positive displacement machine.

12. A pressure swing adsorption system of claim 4 wherein the system is designed for a PSA or VPSA process and the more absorbable gas is nitrogen and the less absorbable gas is oxygen.

13. A pressure swing adsorption system of claim 4 wherein the controller is designed to limit the idle time to less than 8 percent of the total cycle time.

14. A pressure swing adsorption system of claim 4 wherein the controller is designed to limit the idle time to less than 3 seconds.

15. A pressure swing adsorption system of claim 4 wherein the system is a two-bed system.

16. A pressure swing adsorption system of claim 4 wherein the system is for the production or oxygen from air.

17. A pressure swing adsorption system of claim 4 wherein the pressure ratio conditions during deceleration are measured using a pressure measuring device.

* * * * *